United States Patent
Garg et al.

(10) Patent No.: US 10,749,763 B2
(45) Date of Patent: Aug. 18, 2020

(54) RELIABLE ADDRESS DISCOVERY CACHE

(71) Applicant: Microsoft Technology Licensing, LLC, Redmond, WA (US)

(72) Inventors: Pankaj Garg, Bellevue, WA (US); Praveen Balasubramanian, Redmond, WA (US); Stephen E. Bensley, Kirkland, WA (US); Luis I. Martinez Castillo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 271 days.

(21) Appl. No.: 15/681,670

(22) Filed: Aug. 21, 2017

(65) Prior Publication Data
US 2018/0131584 A1    May 10, 2018

Related U.S. Application Data (63) Continuation of application No. 14/024,522, filed on Sep. 11, 2013, now Pat. No. 9,742,636.

(51) Int. Cl.
*G06F 15/173* (2006.01)
*H04L 12/26* (2006.01)
(Continued)

(52) U.S. Cl.
CPC ............ *H04L 43/00* (2013.01); *H04L 61/103* (2013.01); *H04L 61/2076* (2013.01);
(Continued)

(58) Field of Classification Search
CPC ... H04L 43/00; H04L 61/103; H04L 61/2076; H04L 61/6009; H04L 67/2842; H04L 45/02
See application file for complete search history.

(56) References Cited

U.S. PATENT DOCUMENTS 5,278,829 A  *  1/1994  Dunlap ................ H04L 29/06
                                                        340/9.14
7,693,158 B1     4/2010  Carrie
                        (Continued)

FOREIGN PATENT DOCUMENTS

CN       102726021     10/2012
WO    WO-2010138937    12/2010
                (Continued)

OTHER PUBLICATIONS

CJ Williams, "What's new in Hyper-V Network Virtualization in R2—Microsoft Enterprise Networking Team", TechNet Blogs, Jul. 31, 2013, pp. 1-4, XP055154131 (Year: 2013).*

(Continued)

*Primary Examiner* — Jonathan A Bui
(74) *Attorney, Agent, or Firm* — Newport IP, LLC; Michael C. Johnson (57) ABSTRACT

Reliable address discovery cache techniques are described. In an implementation, a reliable communication channel is established for control messages related to address resolution in a network. The communication channel is employed for communication of messages for internet protocol (IP) address acquisition, release, and mapping staleness between clients (e.g., nodes or endpoints) in the network and a cache manager component configured to maintain and update an address map for the clients. The cache manager component may also be configured to send directed messages via the communication channel to propagate changes in the mapping to the clients. Further, clients may provide explicit notifications regarding address release and staleness to the cache manager component to facilitate updating of the address map. In this way, a reliable and up-to-date address map is maintained and the amount of broadcast discovery (Continued)

messages and bandwidth consumed overall for address discovery operations may be reduced.

18 Claims, 6 Drawing Sheets

(51) Int. Cl.
*H04L 29/12* (2006.01)
*H04L 29/08* (2006.01)
*H04L 12/751* (2013.01)

(52) U.S. Cl.
CPC ...... *H04L 61/6009* (2013.01); *H04L 67/2842* (2013.01); *H04L 45/02* (2013.01)

(56) References Cited

U.S. PATENT DOCUMENTS

| | | | |
|---|---|---|---|
| 7,796,614 | B1 | 9/2010 | Weymans |
| 8,370,834 | B2 | 2/2013 | Edwards et al. |
| 9,742,636 | B2 | 8/2017 | Garg et al. |
| 2003/0142642 | A1* | 7/2003 | Agrawal ............ H04L 61/2015 370/328 |
| 2006/0002407 | A1 | 1/2006 | Sakamoto |
| 2006/0212549 | A1* | 9/2006 | Hokkyo ............ H04L 29/12216 709/220 |
| 2008/0155612 | A1* | 6/2008 | Ikeda ................ H04N 21/4384 725/87 |
| 2010/0325257 | A1* | 12/2010 | Goel .................... H04L 61/103 709/223 |
| 2011/0320630 | A1 | 12/2011 | Mogul et al. |
| 2012/0089714 | A1 | 4/2012 | Carley |
| 2013/0086236 | A1 | 4/2013 | Baucke et al. |
| 2014/0003426 | A1 | 1/2014 | Sankar et al. |
| 2015/0074261 | A1 | 3/2015 | Garg et al. |

FOREIGN PATENT DOCUMENTS

| | | | | |
|---|---|---|---|---|
| WO | WO-2010138937 | A2 * | 12/2010 | ......... H04L 12/4633 |
| WO | WO-2013064951 | | 5/2013 | |

OTHER PUBLICATIONS

"Foreign Office Action", CN Application No. 201480050345.6, dated Apr. 4, 2018, 11 pages.
"Communication Networks/TCP and UDP Protocols", Retrieved at: https://en.wikibooks.org/wiki/Communication_Networks/TCP_and_UDP_Protocols—on Aug. 12, 2015, 43 pages.
"Corrected Notice of Allowance", U.S. Appl. No. 14/024,522, dated Apr. 27, 2017, 2 pages.
"Corrected Notice of Allowance", U.S. Appl. No. 14/024,522, dated Jul. 20, 2017, 2 pages.
"Final Office Action", U.S. Appl. No. 14/024,522, dated Aug. 30, 2016, 17 pages.
"Foreign Office Action", EP Application No. 14781711.8, dated Jun. 14, 2017, 4 pages.
"International Preliminary Report on Patentability", Application No. PCT/US2014/054448, dated Dec. 14, 2015, 13 pages.
"International Search Report and Written Opinion", Application No. PCT/US2014/054448, dated Dec. 4, 2014, 16 Pages.
"Non-Final Office Action", U.S. Appl. No. 14/024,522, dated Feb. 10, 2017, 12 pages.
"Non-Final Office Action", U.S. Appl. No. 14/024,522, dated Apr. 5, 2016, 15 pages.
"Notice of Allowance", U.S. Appl. No. 14/024,522, dated Apr. 7, 2017, 9 pages.
"OTV Technology Introduction and Deployment Considerations", Cisco Systems, Inc., Jan. 17, 2012, 58 pages.
"Second Written Opinion", Application No. PCT/US2014/054448, dated Aug. 4, 2015, 21 Pages.
Greenberg,"VL2: A Scalable and Flexible Data Center Network", SIGCOMM 2009, Aug. 17-21, 2009, Barcelona, Spain, ACM, New York, NY, USA, vol. 39, No. 4, Aug. 17, 2009, 12 Pages.
Klein,"Modeling and Evaluation of Address Resolution Scalability in VPLS", In IEEE International Conference on Communications, Jun. 10, 2012, pp. 2741-2746.
Shah,"ARP Broadcast Reduction for Large Data Centers", In Working Group: ARMD, Intended Status: Informational, Internet Draft, Oct. 28, 2011, pp. 1-11.
Williams,"What's New in Hyper-V Network Virtualization in R2", Retrieved from: <http://blogs.technet.com/b/networking/archive/2013/07/31/what-s-new-in-hyper-v-network-virtualization-in-r2.aspx> on Sep. 6, 2013, Jul. 31, 2013, 4 pages.
"Office Action Issued in Chinese Patent Application No. 201480050345.6", dated Oct. 15, 2018, 6 Pages.

* cited by examiner

RELIABLE ADDRESS DISCOVERY CACHE

RELATED APPLICATION

This application is a continuation of and claims priority to U.S. patent application Ser. No. 14/024,522 filed Sep. 11, 2013 entitled "Reliable Address Discovery Cache", the disclosure of which is incorporated by reference herein in its entirety.

BACKGROUND

In order to communicate with each other in a network, clients resolve each other's network and hardware address to ensure that communications are routed to the correct recipients. In traditional techniques, this involves broadcasting or multicasting of Address Resolution Protocol (ARP) messages for IPv4 and/or Neighbor Discovery (ND) messages for IPv6 on the network, which can result in significant network traffic and resource usage. Such broadcast address discovery messages may be flooded across clients and switch ports within very large network domains and thereby consume considerable network bandwidth. The problem of network bandwidth consumption by broadcast address discovery messages is exacerbated by the relatively recent growth in the availability of virtual networking environments that implement virtual machines as the proliferation of virtual machines creates a corresponding increase in the number of Internet Protocol (IP) address to hardware address mappings. Thus, existing techniques for address resolution that employ broadcast or multicast messages and deplete bandwidth may be inefficient and/or inadequate for virtual networking environments, as well as for other usage scenarios.

SUMMARY

Reliable address discovery cache techniques are described. In an implementation, a reliable communication channel is established for control messages related to address resolution in a network. The communication channel is employed for communication of messages for Internet Protocol (IP) address acquisition, release, and mapping staleness between clients (e.g., nodes or endpoints) in the network and a cache manager component configured to maintain and update an address map for the clients. The cache manager component may also be configured to send directed messages via the communication channel to propagate changes in the mapping to the clients. Further, clients may provide explicit notifications regarding address release and staleness to the cache manager component to facilitate updating of the address map. In this way, a reliable and up-to-date address map is maintained and the volume of broadcast discovery messages and bandwidth consumed overall for address discovery operations may be reduced.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

DETAILED DESCRIPTION

Overview

Broadcast or multicast messages traditionally employed for address discovery in a network can result in significant network traffic and resource usage. This may be problematic particularly with respect to virtual networking environments that have a large number of virtual machines leading to a corresponding number of IP address to hardware address mappings to maintain and manage. Thus, existing address resolution techniques may be inefficient and/or inadequate for virtual networking environments, as well as for other usage scenarios.

Reliable address discovery cache techniques are described. In an implementation, a reliable communication channel is established for control messages related to address resolution in a network. The communication channel is employed for communication of messages for internet protocol (IP) address acquisition, release, and mapping staleness between clients (e.g., nodes or endpoints) in the network and a cache manager component configured to maintain and update an address map for the clients. The cache manager component may also be configured to send directed messages via the communication channel to propagate changes in the mapping to the clients. Further, clients may provide explicit notifications regarding address release and staleness to the cache manager component to facilitate updating of the address map. In this way, a reliable and up-to-date address map is maintained and the volume of broadcast discovery messages and bandwidth consumed overall for address discovery operations may be reduced.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Lastly, an example system and components of the system are discussed that may be employed to implement embodiments of the techniques described herein.

Example Environment

Figure 1:
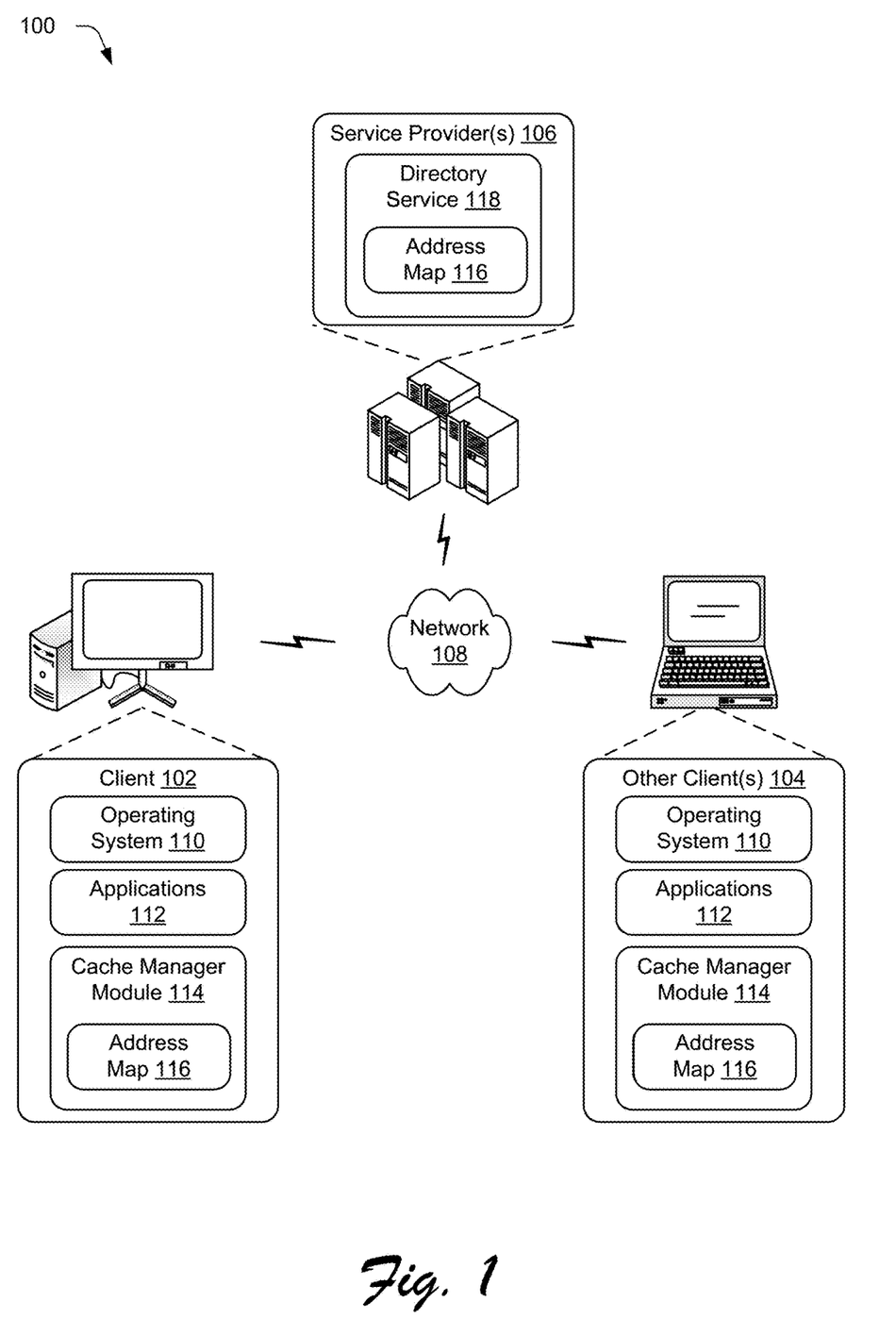
FIG. 1 is an illustration of an example operating environment that is operable to employ techniques for reliable address discovery cache.

FIG. 1 is an illustration of an environment 100 in an example implementation that is operable to employ techniques described herein. The illustrated environment 100 includes a client 102, another client 104, and a service provider 106 that are communicatively coupled via a network 108. The client 102, other client 104, and service provider 106 may be implemented by one or more computing devices and also may be representative of one or more entities. Clients 102 and 104 may also represent a virtual machine in a virtual networking environment additional details of which are discussed in relation to FIG. 2 below.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, handheld game consoles). Additionally, although a single computing device is shown in some instances, the computing device may be representative of a plurality of different devices, such as multiple servers of the service provider 106 utilized by a business to perform operations, provide a datacenter, and so on. Further examples of computing systems and devices suitable to implement techniques described herein are described below in relation to FIG. 6.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The client 102 and other client 104 are each illustrated as including an operating system 110. The operating system 110 is configured to abstract underlying functionality of the underlying device to applications 112 that are executable by the clients. For example, the operating system 110 may abstract processing, memory, network, and/or display functionality such that the applications 112 may be written without knowing "how" this underlying functionality is implemented. The application 112, for instance, may provide data to the operating system 110 to be rendered and displayed by a display device as illustrated without understanding how this rendering will be performed. A variety of applications 112 typically associated with clients are contemplated including, but not limited to, a productivity suite that integrates multiple office productivity modules, a web browser, games, a multi-media player, a word processor, a spreadsheet program, a photo manager, and so forth.

The clients are also illustrated as each including a cache manager module 114. The cache manager module 114 represents functionality to enable reliable address discovery cache techniques described herein. For example, the cache manager module 114 associated with clients may include or otherwise make use of an address map 116 that is configured to associate internet protocol (IP) addresses for clients in the network 108 (or a particular subnet) with hardware addresses for physical hardware of the clients, such as a media access control (MAC) address, network interface card (NIC) identifier, or other suitable hardware address. Each client may store a local version of the address map 116. A hosted version of the address map 116 may also be maintained by a client acting as a host, a router, a virtual switch, a central directory, or other designated component from which updates to the address map 116 may be propagated to clients.

The address map 116 enables clients to communicate one to another by addressing messages/packets with appropriate addressing information so the messages/packets may be routed correctly to intended recipients by network components. The cache manager module 114 may be configured to maintain the address map 116 including updating the address map 116 with new IP address assignments, deleting entries for release IP addresses, discovering and marking stale entries, and propagating changes to the address map to various clients. The cache manager module 114 is further configured to implement a reliable communication channel for control messages related to address resolution, such as a Transmission Control Protocol/Internet Protocol (TCP/IP) or comparable protocol.

The service provider 106 is depicted as including a directory service 118 that map be employed in some implementation for propagation of an address map 116 and updates made to the map throughout clients of a network. The directory service 118 represents a central directory for an address map 116 that may be used to ensure that a reliable and up-to-date version of the map is available for distribution to clients. In addition or alternatively, cache manager modules 114 associated with different clients may communicate directly one to another to handle propagation and updating of the address map using the reliable communication channel that is established.

In general, techniques for a reliable address discovery cache described above and below may be implemented by physical client device and components (e.g., routers and switches) as well as by virtual machines, switches, and other components in a virtual networking environment. Naturally, combinations of physical and virtual machines/clients are also contemplated. In the following discussion, some examples and details are discussed in relation to a virtual networking environment that may include multiple virtual machines. The described techniques, however, are equally applicable to networks of physical client devices and "mixed" networks that include a mix of physical client devices and virtual machines.

Figure 2:
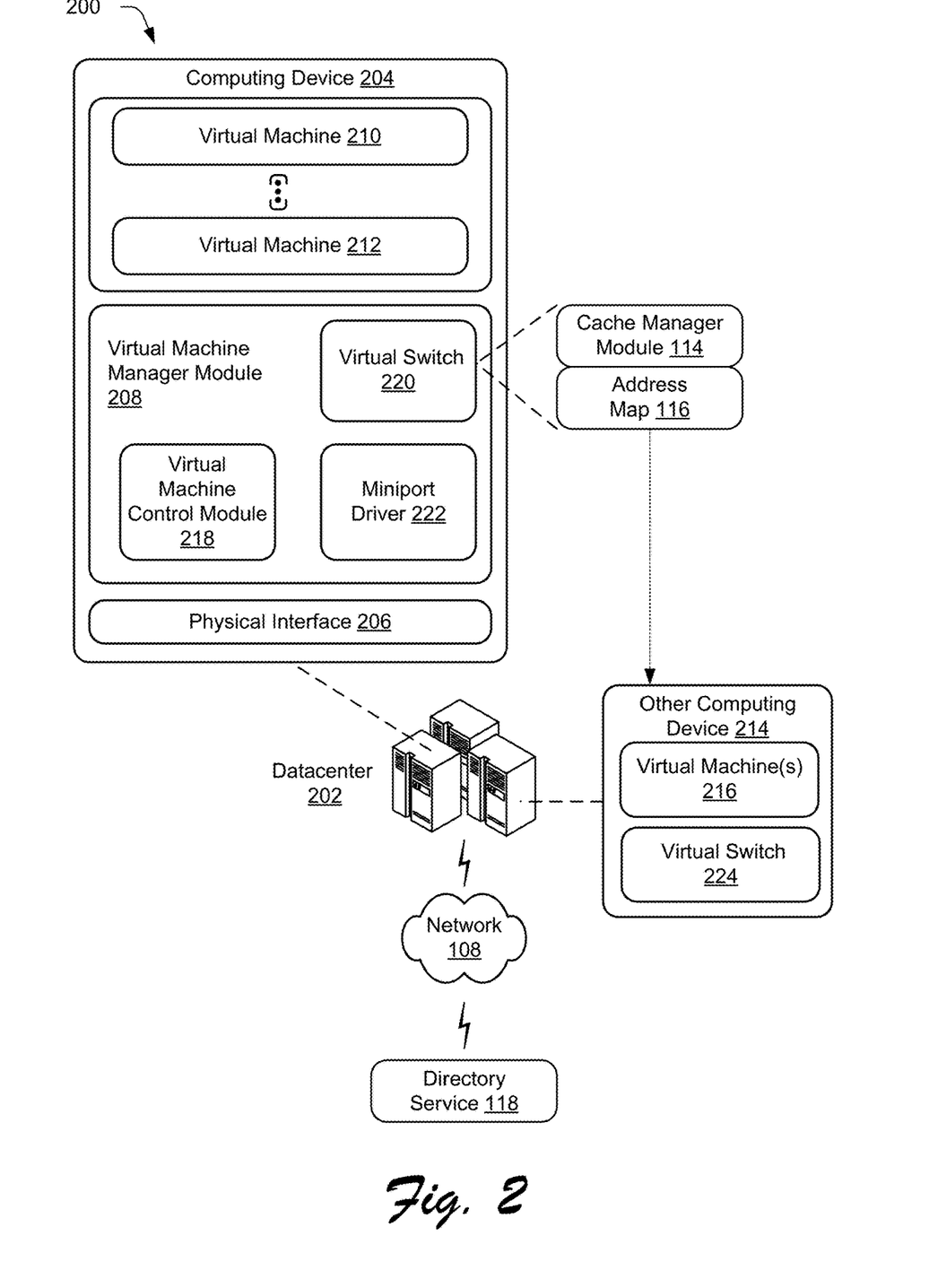
FIG. 2 is a diagram depicting an example virtual networking environment in accordance with one or more embodiments.

To further illustrate techniques for a reliable address discovery cache, consider now FIG. 2, which depicts a diagram showing generally at 200 an example virtual networking environment in which techniques described herein may be implemented. The example virtual networking environment depicts a datacenter 202 that may house multiple physical devices (e.g., servers, storage, network devices, etc.) that may be configured to provide virtualized and/or cloud-based computing resources (e.g., content and services). Although a single datacenter 202 is depicted, it is to be appreciated that a virtual networking environment may span one or more datacenters and may be implemented by physical devices located at one or more different geographical locations.

The example datacenter 202 includes a computing device 204 having a physical interface 206, a virtual machine manager module 208, and one or more virtual machines 210, . . . , 212. Other computing devices 214 of the virtual networking environment may each include one or more corresponding virtual machines 216 and respective virtual machine manager modules 208 and that may be configured in a comparable manner as the example components that are represented in relation to computing device 204.

Virtual machine manager module 208 is representative of functionality to manage the creation, operation, and termination of virtual machines 210, 212, including access to the functionality provided by physical interface 206 for virtual machines 210, 212. The physical interface 206 is representative of a communication component, such as a wired and/or wireless network adapter (e.g., network interface card (NIC)). Although a single physical interface 206 is illustrated in FIG. 1, it should be noted that computing device 204 can include multiple physical interfaces of the same and/or different types, and that virtual machine manager module 208 can manage access to the functionality provided by those multiple physical interfaces.

Thus, virtual machine manager module 208 allows one or more virtual machines 210, 212, 216 to run on respective computing devices 204, 214. Any number of virtual machines can run be on a particular computing device. A virtual machine refers to a software implementation of a computing device (or other machine or system) that is configured to executed programs analogous to a physical computing device. Each virtual machine 210, 212, 216 for instance, may execute an operating system and other applications, and each such operating system and application may be executed without being aware that this execution occurs using a virtual machine and thus this execution may occur without specialized configuration of the applications and other software.

Virtual machine manager module 208 is illustrated as including a virtual machine (VM) control module 218, a virtual switch 220, and a miniport driver 222. The virtual machine control module 218 is representative of functionality to manage the execution of virtual machines. This management may include wither to allow the virtual machines to be run (launched) and terminated, controlling migrating of virtual machines from one computing device to another (e.g., between computing device 204 and other computing devices 214 via network 108), and so forth.

The virtual switch 220 is configured to allow the virtual machines to communicate with one another as well as optionally other physical devices via physical interface 206 and network 108. In some implementations, the virtual switch 220 is extensible and therefore may be configured to allow different extensions to be added to enhance or modify capabilities of the virtual switch 220. For example, the virtual switch 220 may be configured to implement a cache manager module 114 to maintain, update, distribute, and otherwise manage an address map 116 that contains information regarding IP address to hardware address mappings for virtual machines and/or other clients in a network or subnet. In at least some implementations, the address map 116 may be maintained and propagated to clients in the network through a directory service 118.

The miniport driver 222 is representative of an interface that is configured to provide operations specific to physical interface 206 and allow virtual switch 116 to communicate with physical interface 206. Although a single miniport driver 222 is illustrated, multiple miniport drivers 222 may be provide for computing devices having multiple physical interfaces 206, with one miniport driver corresponding to each physical interface 206.

In operation, a cache manager module 114 may be implemented by a client 102, as a component of a virtual switch 220 in a virtual network environment, or otherwise to perform operations for reliable address discovery in a corresponding network. The operations may include but are not limited to management of IP address acquisition, IP address release, cache staleness, and address resolution handling.

As mentioned previously, the cache manager module 114 may establish a reliable communication channel for handling of control messages related to address discovery including IP address acquisition, IP address release, and cache staleness. In one approach, the reliable communication channel may be a TCP/IP based channel. Other suitable channels using various communication protocols are also contemplated. Generally, the communication channel provides a mechanism for direct and/or explicit notifications from clients/virtual machines to the cache manager module 114. Notification messages sent via the communication channel for cache management are non-broadcast. The cache manager module 114 may then validate and update an address map 116 based on the explicit notifications and propagate any changes to other clients/virtual machines. The propagation of updated mapping information between clients also may occur via the communication channel In one approach the mapping information is propagated between cache manager modules 114 associated with each client/virtual machine, either directly or through a directory service 118. This may involve propagation of the mapping to multiple physical machines and/or network devices. For example, an address map 116 and/or any updates thereto may be propagated between the virtual switch 220 and a virtual switch 224 associated with the other computing device 214 as represented in FIG. 2.

Since the cache manager module 114 handles the propagations and explicit, non-broadcast notifications are directed to the cache manager module/virtual switches rather than being sent as broadcast messages, the likelihood of experiencing dropped packets, inaccurate/stale data, and/or inconsistent or out-of-date mappings at different endpoints is reduced in comparison with techniques that rely on broadcast messages. Thus, the communication channel is considered "reliable" in the sense that it enables creation, availability, and distribution of an accurate and up-to-date address map 116 that can be trusted by clients/virtual machines across the network. Details regarding these and other aspects of a reliable address discovery cache are described in relation to the following example procedures.

Having considered an example environment and scenarios, consider now a discussion of some example procedures in accordance with one or more embodiments.

Example Procedures

The following discussion describes reliable address discovery cache techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the environment 200 of FIG. 2. In at least some embodiments, the procedures may be performed by a suitably configured computing device, such as a client or virtual machine that includes or otherwise makes use of a cache manager module 114. As introduced above, the cache manager module 114 may be configured to perform various operations to implement a reliable address discovery cache including at least address map acquisition and propagation, address release and staleness techniques, and address discovery messaging handling, details of which are discussed in respective sub-sections just below in relation to corresponding example procedures.

Address Map Acquisition and Propagation

In order to provide a reliable address discovery cache, a mapping of IP addresses to hardware address for clients/endpoints in a network is acquired by one or more network components, such as a cache manager module 114 associated with at least some of the clients/endpoints. Acquisition of address mapping information may occur in various ways. The address mapping may then be propagated to other components via a reliable communication channel as previously described. Further details regarding techniques for address map acquisition and propagation are now discussed in relation to the example procedure 300 of FIG. 3.

Figure 3:
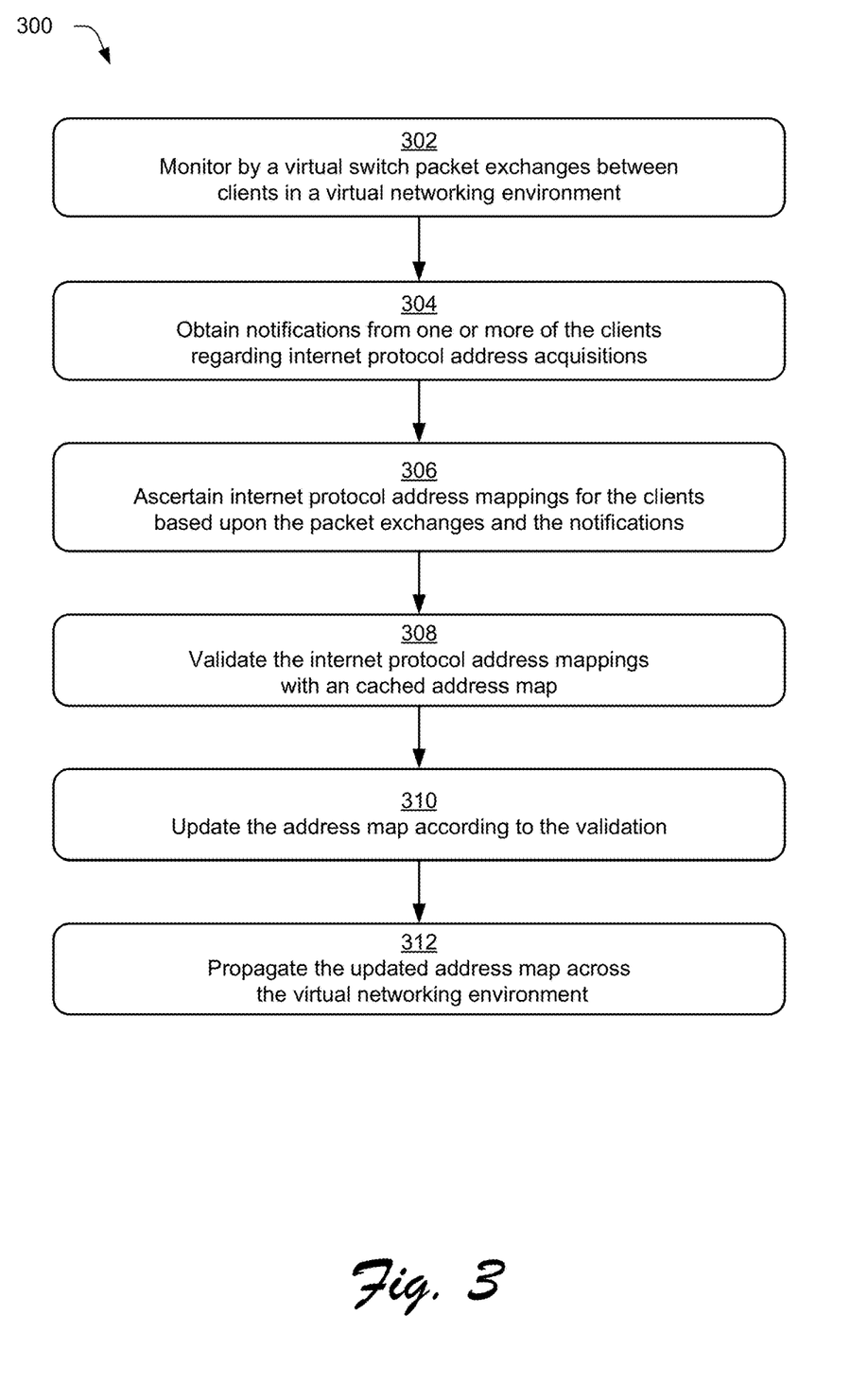
FIG. 3 is a flow diagram depicting an example procedure for IP address acquisition in accordance with one or more embodiments.

In particular, FIG. 3 is a flow diagram depicting example procedure 300 in which packet exchange and explicit notifications may be employed to learn an address map. In the example, aspects of the procedure are discussed in relation to a virtual switch of a virtual network. However, comparable techniques may also be implemented via other suitable components of both virtual and physical networks such as a physical switch, a router, firmware of a physical interface, software of individual virtual machines, and so forth.

A virtual switch monitors packet exchanges between clients in a virtual networking environment (block 302). Additionally, notifications from one or more of the clients regarding internet protocol address acquisitions are obtained (block 304). Then, internet protocol address mappings for the clients are ascertained based upon the packet exchanges and the notifications (block 306). In various implementations, packet exchanges and explicit notifications indicative of IP address mappings (e.g., association of IP addresses with hardware addresses) may be employed individually or in combination to generate and update an address map.

The packet exchanges may include address discovery messages, replies, and/or other communications that contain indications of associations of IP address with the clients. In a virtual networking environment scenario the clients may correspond to virtual machines. In other scenarios, the clients may include different physical computing devices. In one implementation, a cache manager module 114 implemented by the virtual switch (or otherwise) is configured to perform the monitoring, parse packets to recognize IP address associations, and update an address map accordingly.

The cache manager module 114 (or other comparable component) may also receive and process explicit notifications from clients indicative of IP address acquisitions by the clients. For example, virtual machines in a virtual networking environment may each include a component (e.g., software, hardware, firmware, or combination thereof) configured to send notifications for receipt by the cache manager module 114 and/or a corresponding switch including but not limited to indications of address acquisition, release, staleness, and so forth. The notifications may be sent as directed, non-broadcast messages over a reliable communication channel as described herein. Such notifications may also be provided by components of physical computing devices in physical network in a corresponding manner. The cache manager module 114 may then parse the notifications to recognize IP address associations, and update an address map accordingly. In this way, address map 116 may be formulated and maintained based upon a combination of acquisition techniques including packet exchange monitoring and explicit notifications over a reliable channel.

The internet protocol address mappings are validated based upon a cached address map (block 308) and the address map is updated according to the validation (block 310). This step ensures that new and/or changed mappings employed to update the cached information reflect the most accurate and up-to-date information available. The validation may involve checking acquired address information against entries in cached address map, which may be a locally stored version of the map and/or an address map maintained by and made available from a directory service 118. New mappings for clients may be added to the address map. Additionally, existing entries may be updated to reflect changes in IP address assignments and/or in the case of virtual machines changes to hardware addresses associated with a particular virtual machine (e.g., if the particular virtual machine is migrated between different physical devices).

The validation may also resolve conflicts that may arise between acquired information and the cached version of the address map according to a conflict resolution scheme. In one approach, this may involve comparing timestamps, priority values, and/or other validation parameters between conflicting address associations in order to select address associations that are ascertained as the most accurate and up-to-date. The selected address associations are then used to produce the updated address map.

The updated address map is propagated across the virtual networking environment (block 312). For example, an address map updated by a particular virtual switch may be propagated selectively to other virtual switches in the network in the manner discussed in relation to the example of FIG. 2. The entire address map and/or data suitable to indicate changes to the map may be communicated via a reliable communication channel described herein. The updates may be sent directly between clients, such as by communication between switches and/or cache manager modules associated with different physical and virtual machines. In some implementations, the directory service 118 may be configured to maintain a common or "master" version of the address map 116 that is updatable via the communication channel by various switches and/or other designated network components. In this approach, propagating the updated address map may involve communicating with the directory service 118 to cause appropriate changes to the address map 116. The directory service 118 may then handle distribution of the address map 116. This may occur by directly sending the address map 116 to each switch and/or designated network components, making the address map 116 available for download from the service, or otherwise.

Address Release and Staleness Techniques

Techniques for handling address release and address map staleness are another aspect of providing a reliable address discovery cache. Graceful handling of address release and staleness scenarios prevents or limits situations in which inaccurate and/or inconsistent information is propagated to different entities in the network. In general, the reliable communication channel may be leveraged to enable explicit notifications of IP address release and/or staleness conditions that are used to make corresponding changes to the address map. Further details regarding techniques for address release and staleness are now discussed in relation to the example procedure 400 of FIG. 4.

Figure 4:
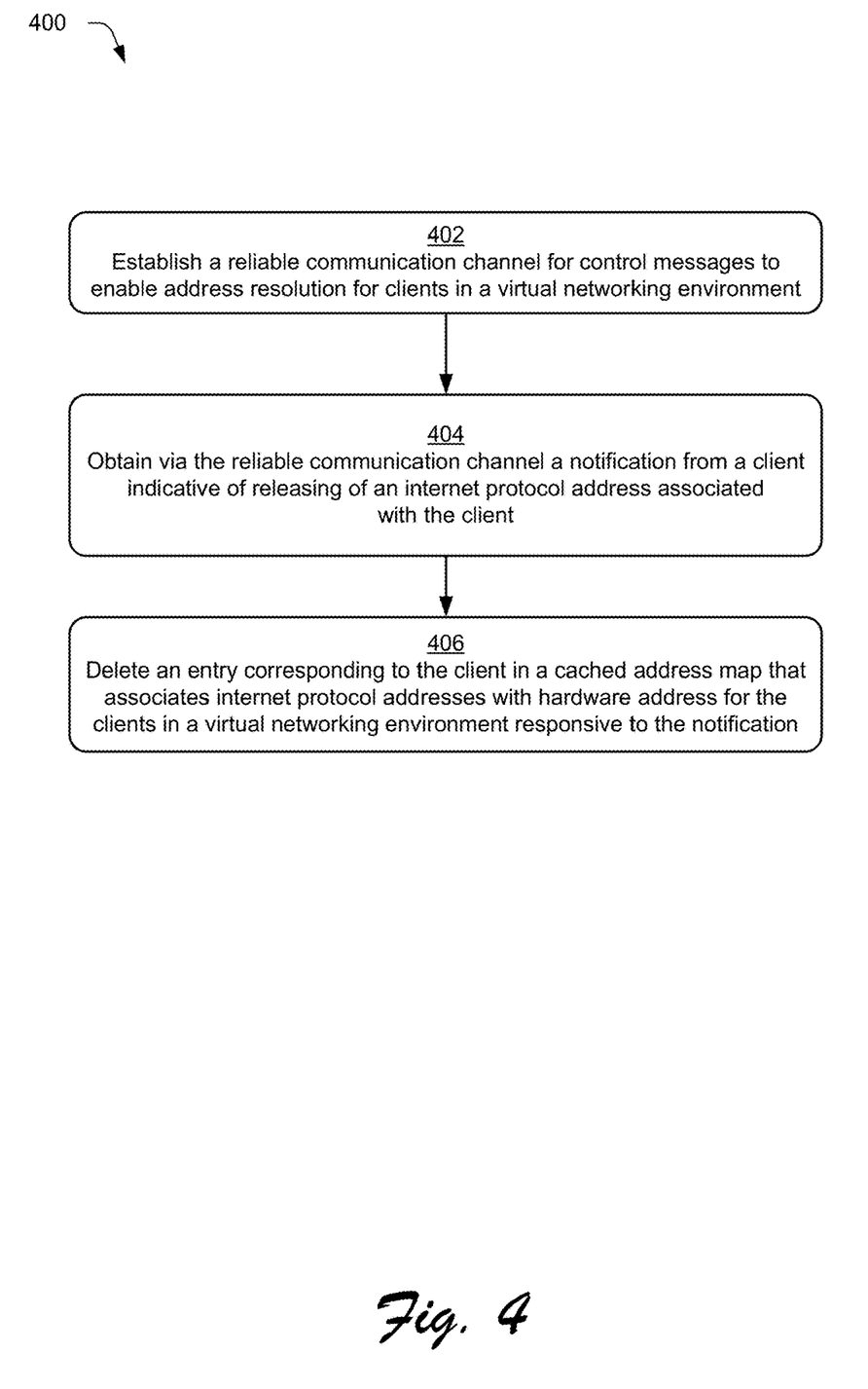
FIG. 4 is a flow diagram depicting an example procedure for IP address release in accordance with one or more embodiments.

In particular, FIG. 4 is a flow diagram depicting a procedure 400 in which explicit notifications are employed to update an address map in response to IP address release. Comparable techniques may be employed to update the address map in response to detection of staleness of one or more entries in the map.

A reliable communication channel for control messages is established to enable address resolution for clients in a virtual networking environment (block 402). A notification from a client is obtained via the reliable communication channel indicative of releasing of an internet protocol address associated with the client (block 404). An entry corresponding to the client is deleted in a cached address map that associates internet protocol addresses with hardware address for the clients in a virtual networking environment responsive to the notification (block 406).

The reliable communication channel may be established using TCP or another suitable protocol as discussed previously. A component of each physical or virtual machine may be operable to send various notifications via the communication channel to facilitate reliable address discovery cache techniques. Such communication may be directed for handling by a cache manager module 114 or equivalent functionality. The notifications may include IP address acquisition notifications as discussed in relation to FIG. 4. The notifications may also include message related to IP address release and or staleness.

Thus, in the case of IP address release, a client/virtual machine may send a control message indicating that the IP address was released. The control message is intended to cause the cache manager module 114 to delete a corresponding entry from the address map 116. In response to receiving the control message generated when an IP address is released, the cache manager module 114 may look-up a corresponding entry and delete the entry. The deletion may then be propagated across the network environment (e.g., to various switches, management components/modules, and/or devices). The propagation occurs via the communication channel in substantially the same way as propagation of address acquisition information, address maps, and other propagated data discussed above and below.

As noted, similar techniques may be employed in response to detection of cache staleness. In particular, a client/virtual machine may detect staleness of the address map in some instance. This may occur for example if the client/virtual machine fails to receive an acknowledge message (TCP ACK), reply, or response from an intended recipient of a communication using a propagated version of the address map. In this case, clients/virtual machines may communicate a control message notification indicative of the staleness of the particular entry. The control message is intended to cause the cache manager module 114 to reflect the staleness of the entry in the address map 116. In one approach, the cache manager module 114 may mark the entry as being stale in response to receiving the control message. In addition or alternatively, the entry may be deleted in some implementations.

Notably, the staleness management described herein may occur without the use of timeouts. Although timeouts are relatively simple to implement, timeouts may be inefficient because the timing of a record becoming stale rarely matches the timeout exactly. Thus, some good records may be considered stale too soon and some stale records may linger within mappings for too long after becoming stale when timeouts are relied upon. On the other hand, explicit staleness notifications from clients/virtual machines as described herein may more precisely pinpoint mapping records that are stale and timing of when the records become stale. Accordingly, the use of explicit staleness notifications as well as other explicit notification leads to a more accurate and up-to-date address map 116 in comparison with traditional techniques that rely upon broadcast messages and/or timeouts.

Address Discovery Message Handling

A further aspect of providing a reliable address discovery cache is the way in which address discovery messages are handled by the system. As noted previously, address discovery messages as used herein may include Address Resolution Protocol (ARP) messages, Neighbor Discovery (ND) messages and other comparable broadcast or multicast messages. For simplicity, the discussion herein describes some aspects in relation to broadcast messages. Generally though usage of the term broadcast message herein encompasses either or both of broadcast messages and multicast messages. Generally, at least some such broadcast messages may be intercepted and responded to locally, rather than further distributing the broadcast message across the wider network. By so doing, the impact of address discovery messages on network bandwidth may be alleviated. The interception and local response operations may occur via a cache manager module 114 or equivalent functionality implemented by a virtual switch, a physical switch, or other network component. Further details regarding techniques for address discovery message handling are now discussed in relation to the example procedure 500 of FIG. 5.

Figure 5:
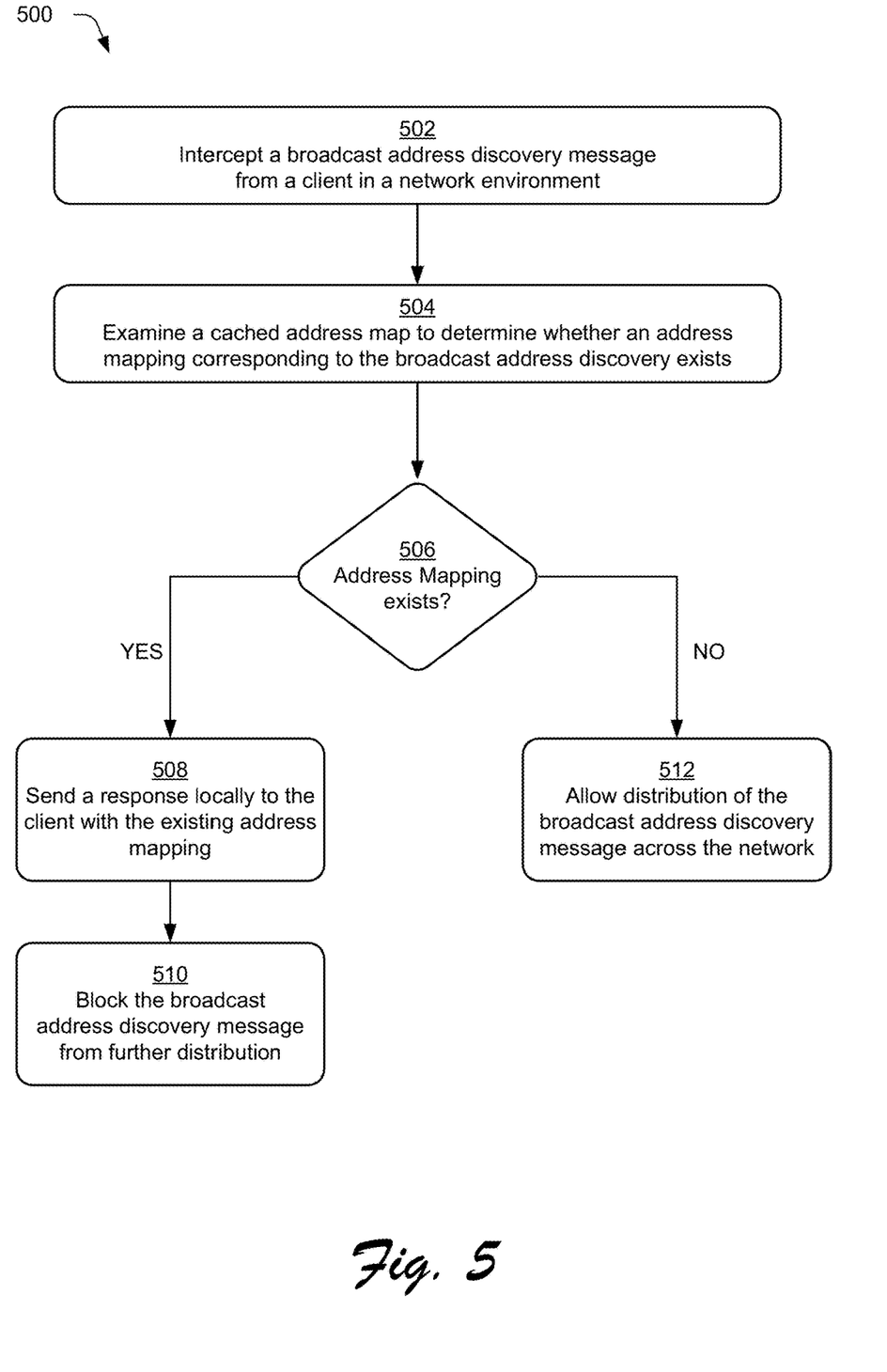
FIG. 5 is a flow diagram depicting an example procedure for handling address discovery messages in accordance with one or more embodiments.

FIG. 5 is a flow diagram depicting a procedure 500 in which address discovery messages are intercepted and handled locally. A broadcast address discovery message from a client in a network environment is intercepted (block 502). For example, an address discovery message seeking to determine a hardware address corresponding to an IP address may be intercepted "locally" by a network component. Other comparable discovery messages to resolve mapping between other types of addresses are also contemplated. This may occur in a virtual networking environment, within a physical network, and/or in a mixed network having both virtual and physical clients. The local interception may occur via a virtual switch, a physical switch, a router, a network interface device, or other network component configured to implement a cache manager module 114 to maintain an address mapping for a set endpoints (clients/virtual machines) in a network, subnet, or other segment of the network. The network component in this case may be considered local with respect to the set of endpoints for which the network component manages address mapping operations.

A cached address map is examined to determine whether an address mapping corresponding to the broadcast address discovery exists (block 504), and based on the examination a determination is made regarding whether or not the address mapping exists (block 506). For instance, an address map 116 as described herein may be available locally at a switch or other network component corresponding to a particular segment of a network. The address map 116 may also be available via a discovery service 118. A cache manager module 114 implemented via the switch or other network component may be configured to employ the address map 116 to respond locally to intercepted address discovery message as opposed to broadcasting the address discovery message out further to other non-local switches, device, machines, and/or other components. As mentioned this can reduce consumption of network bandwidth by the broadcast messages.

In particular, the cache manager module 114 may determine an IP address (or other known address) referenced in the intercepted message by parsing the message. The cache manager module 114 may then use the determined address to look-up entries within a suitable address map 116 to determine if a mapping contained in the address map 116 matches the address. The existence or non-existence the address mapping for the intercepted message as is determined based upon the examination may be configured to control subsequent operations performed by the cache manager module 114.

In particular, when the mapping address exists, a response is sent locally to the client with the existing address mapping (block 508). For example, the cache manager module 114 may generate a response message that contains the existing address mapping and send the response to the requesting client. In addition, the broadcast discovery message is blocked from further distribution (block 510). Here, the cache manager module 114 may delete the message, completer the message with the response, or otherwise take action that prevents broadcast of the message beyond the cache manager module 114 to other endpoints. The further broadcast in this case is unnecessary because the cache manager module 114 has already responded with the appropriate and reliable mapping information obtained from the locally cached address map 116. Blocking the sending of such broadcast messages to the other endpoints may significantly cut down on network traffic.

On the other hand, when the mapping address does not already exist (or if discovered the mapping is stale or out-of-date), distribution of the broadcast address discovery message is allowed across the network (block 512). In this case, the cache manager module 114 may release the address discovery message for further broadcast to the other client endpoints. When a client responds to the message with a discovery reply having an IP address to hardware address mapping, a cache manager module 114 may operate to create a new entry based on this mapping to update the address map 116 in the manner previously described. Note that a new entry may be created either by the client that broadcast the address discovery message and received reply or by a client that issued the reply to the address discovery message. Any subsequent address discovery message for the particular entry/IP address would now result in discovery of the corresponding address mapping per block 506 and the resolution request would be handled using local replies from the cache and without broadcast of the address discovery message in the manner described in relation to block 508 and block 510.

If the address discovery messages are unicast, as in procedures like neighbor unreachability detection (NUD), the address discovery cache may not consult the cached address map and may not respond locally to such messages. Rather, such messages are allowed to be unicasted to the network. A response to such a message may be used as a signal to create a new entry in the cached address map or clear the stale state of the entry in the cached address map.

Having considered some example procedures, consider now a discussion of an example system and device to implement various aspects in accordance with one or more embodiments.

Example System and Device

Figure 6:
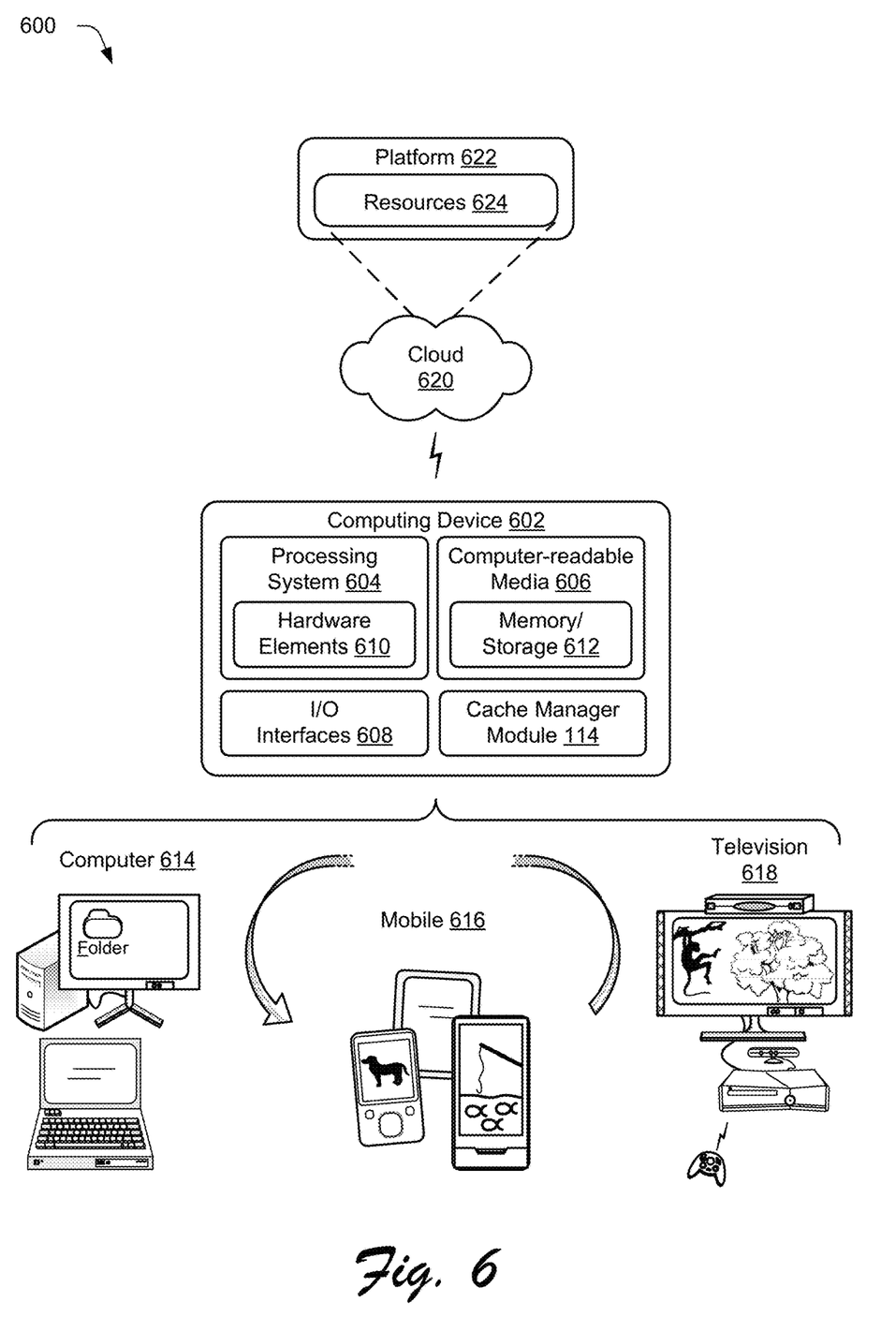
FIG. 6 illustrates various an example system that can be employed to implement embodiments of the techniques described herein.

FIG. 6 illustrates an example system generally at 600 that includes an example computing device 602 that is representative of one or more computing systems and/or devices that may implement the various techniques described herein. The computing device 602 may be, for example, a server of a service provider, a device associated with the client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "communication media."

"Computer-readable storage media" refer to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 602, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including operating system 110, applications 112, cache manager module 114, virtual machine manager module 208, virtual switch 220, and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This is illustrated through inclusion of the cache manager module 114 on the computing device 602. The functionality of the cache manager module 114 and other modules may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. One or more computer-readable storage media comprising instructions that, when executed by a computing device, perform operations comprising:
    intercepting a broadcast address discovery message from a client device in a network environment, the broadcast address discovery message configured for delivery to a plurality of remote devices to obtain a hardware address of a remote device associated with an IP address included in the broadcast address discovery message;
    examining a cached address map to determine whether the IP address included in the broadcast address discovery message exists in the cached address map;
    in response to the determining that the IP address exists in the cached address map, sending a response to the client device, the response including the IP address and the hardware address corresponding to the IP address found in the cached address map, the hardware address enabling the client device to communicate with the remote device; and
    blocking the broadcast address discovery message from further distribution to the plurality of remote devices by deleting the broadcast address discovery message.

2. One or more computer-readable storage media of claim 1, wherein the intercepting occurs in a virtual switch in the network environment.

3. One or more computer-readable storage media of claim 1, wherein the intercepting occurs in a physical switch in the network environment.

4. One or more computer-readable storage media of claim 1, wherein the intercepting occurs in a router in the network environment.

5. One or more computer-readable storage media of claim 1, wherein the intercepting occurs in a network interface device in the network environment.

6. One or more computer-readable storage media of claim 1, wherein the intercepting occurs in a subnet of the network environment.

7. A system comprising:
    at least one processor;
    at least one memory in communication with the at least one processor, the at least one memory having computer-readable instructions stored thereupon that, when executed by the at least one processor, cause the at least one processor to:
    intercept a broadcast address discovery message from a client device in a network environment, the broadcast address discovery message configured for delivery to a plurality of remote devices to obtain a hardware address of a remote device associated with an IP address included in the broadcast address discovery message;
    examine a cached address map to determine whether the IP address included in the broadcast address discovery message exists in the cached address map;
    in response to the determine that the IP address exists in the cached address map, send a response to the client device, the response including the IP address and the hardware address corresponding to the IP address found in the cached address map, the hardware address enabling the client device to communicate with the remote device; and
    block the broadcast address discovery message from further distribution to the plurality of remote devices by deleting the broadcast address discovery message.

8. The system of claim 7, wherein the intercepting occurs in a virtual switch in the network environment.

9. The system of claim 7, wherein the intercepting occurs in a physical switch in the network environment.

10. The system of claim 7, wherein the intercepting occurs in a router in the network environment.

11. The system of claim 7, wherein the intercepting occurs in a network interface device in the network environment.

12. The system of claim 7, wherein the intercepting occurs in a subnet of the network environment.

13. A computer-implemented method, comprising:
    intercepting a broadcast address discovery message from a client device in a network environment, the broadcast address discovery message configured for delivery to a plurality of remote devices to obtain a hardware address of a remote device associated with an IP address included in the broadcast address discovery message;
    examining a cached address map to determine whether the IP address included in the broadcast address discovery message exists in the cached address map;
    in response to the determining that the IP address exists in the cached address map, sending a response to the client device, the response including with the IP address and the hardware address corresponding to the IP address found in the cached address map, the hardware address enabling the client device to communicate with the remote device; and
    blocking the broadcast address discovery message from further distribution to the plurality of remote devices by deleting the broadcast address discovery message.

14. The computer-implemented method of claim 13, wherein the intercepting occurs in a virtual switch in the network environment.

15. The computer-implemented method of claim 13, wherein the intercepting occurs in a physical switch in the network environment.

16. The computer-implemented method of 13, wherein the intercepting occurs in a router in the network environment.

17. The computer-implemented method of 13, wherein the intercepting occurs in a network interface device in the network environment.

18. The computer-implemented method of 13, wherein the intercepting occurs in a subnet of the network environment.

\* \* \* \* \*